Nov. 4, 1924.   1,513,729
D. ADAMS
CHAIN LINK
Filed Jan. 3, 1922   2 Sheets-Sheet 1

INVENTOR
David Adams
BY
Clarence Sperr
ATTORNEY

Nov. 4, 1924.  
D. ADAMS  
CHAIN LINK  
Filed Jan. 3, 1922  
1,513,729  
2 Sheets-Sheet 2

INVENTOR  
David Adams  
BY  
Clarence O. Kerr  
ATTORNEY

Patented Nov. 4, 1924.

1,513,729

UNITED STATES PATENT OFFICE.

DAVID ADAMS, OF SHARON, PENNSYLVANIA, ASSIGNOR, BY MESNE ASSIGNMENTS, TO NATIONAL MALLEABLE AND STEEL CASTINGS COMPANY, OF CLEVELAND, OHIO, A CORPORATION OF OHIO.

CHAIN LINK.

Application filed January 3, 1922. Serial No. 526,531.

*To all whom it may concern:*

Be it known that I, DAVID ADAMS, a citizen of the United States, residing in Sharon, Mercer County, Pennsylvania, have invented new and useful Improvements in Chain Links, of which the following is a specification, reference being had to the accompanying drawings, in which—

Figure 1:
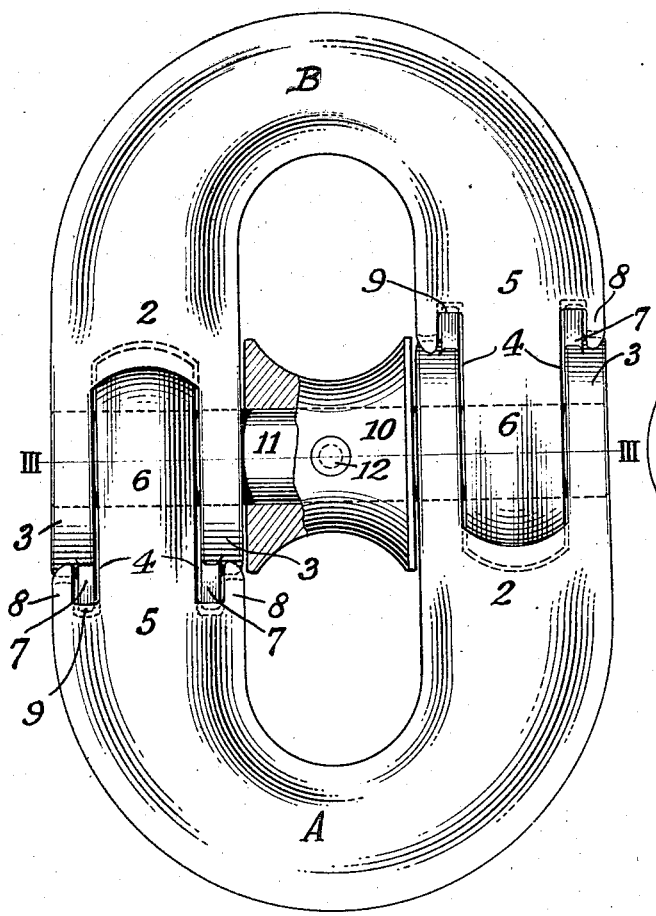
Figure 2:
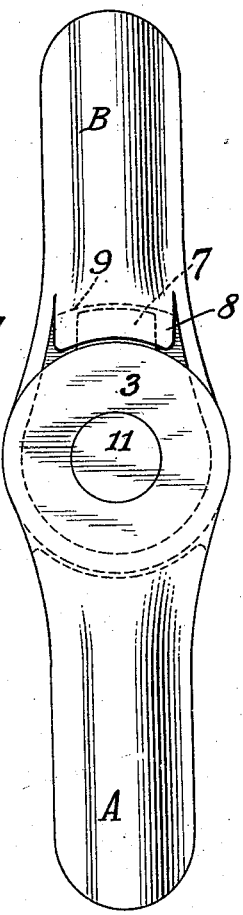
Figure 3:
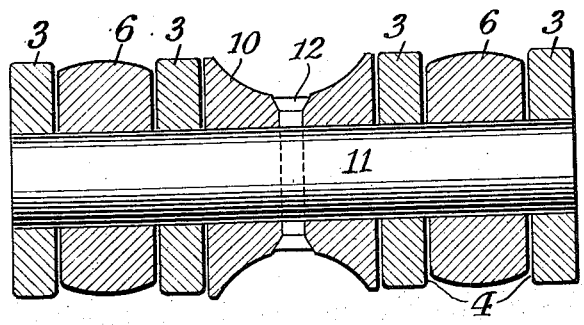
Figure 4:
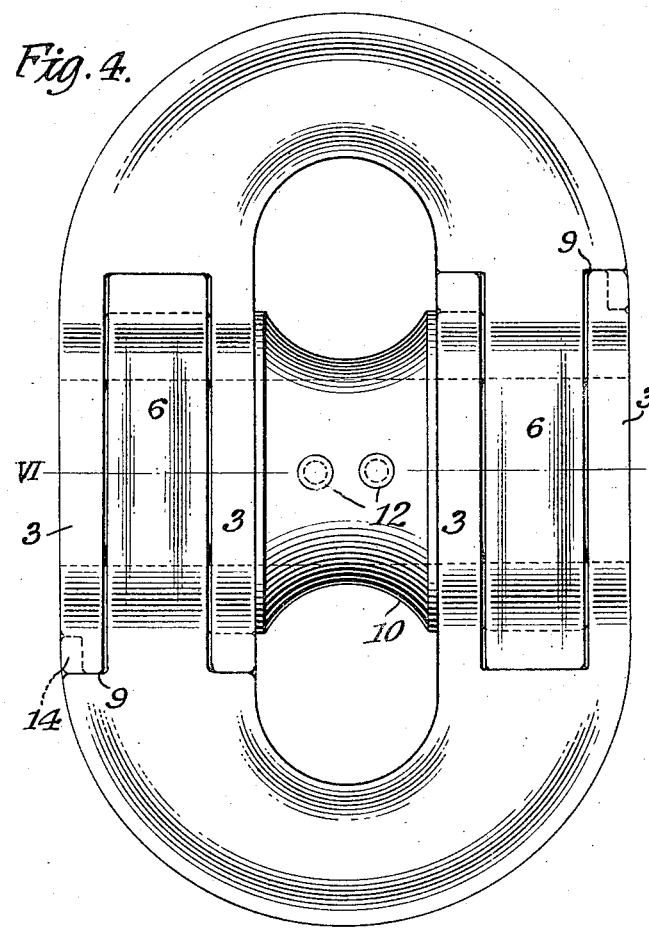
Figure 5:
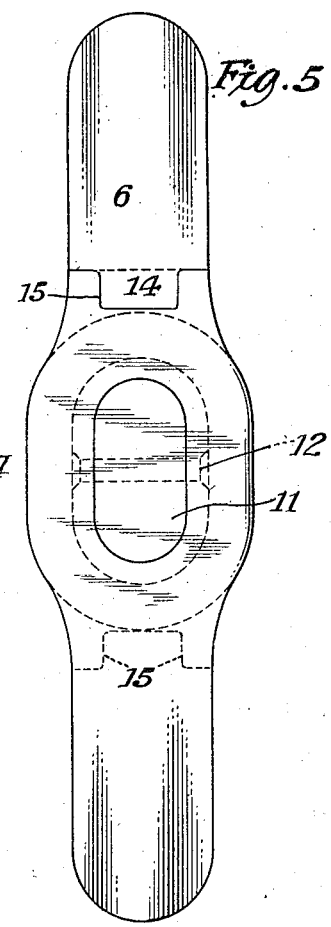
Figure 6:
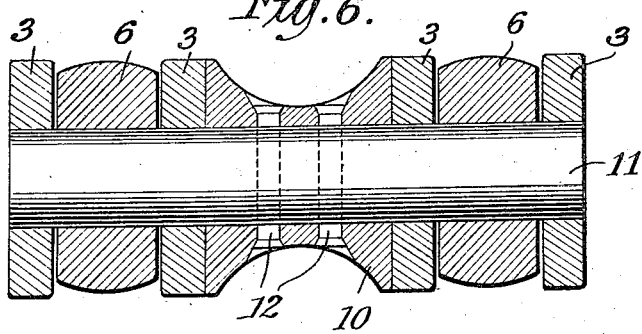

Fig. 1 is a plan of one form of my improved link; Fig. 2 is an elevation thereof; Fig. 3 is a section on line III—III of Fig. 1; Fig. 4 is a plan of a modification of my invention; Fig. 5 is an elevation thereof; and Fig. 6 is a section on line VI—VI of Fig. 4.

My invention relates to links for anchor cables and comprises an insertable link or shackel, which may be employed to repair a broken anchor chain, replace a broken link, or to connect together the shots of chain which make up a length of cable. My invention also comprises the various features which I shall hereinafter describe and claim.

Referring to the drawings, the link proper is made up of the U-shaped, similarly formed parts A and B. Each U-shaped member A or B has at one of its ends 2 arms 3, with a slot 4 therebetween, while its other end 5 terminates in a projection 6, which is so formed that the projection 6 of the part A will enter into the slot 4 between the arms 3 of the part B. Extending forwardly from the ends of the arms 3 are flanges 7, which, when the links are assembled, are overlapped by the flanges 8, which project forwardly from the shoulders 9 at the sides of the projections 6. The stud of the link is formed by the spacing member 10 mounted on the pin or key 11, which extends through registering apertures in the arms 3 and the projections 6. When it is desired to connect two links in the end of lengths of chain, each of the two parts A and B is threaded through the free eye of an end link, the apertures in the arms 3 and projections 6 are brought into register, and the pin or key 11 inserted through such apertures and through the spacing member 10. The spacing member 10 and the pin 11 may then be riveted at 12, thus securing the parts of the link together.

It will be seen that the overlap of the flanges 8 on the ends 5 over the flanges 7 of the arms 3 holds the arms against spreading, while the spacing member 10 holds the link against collapse.

In Figs. 4, 5 and 6 I have shown a modified form of my invention, in which a pin or key substantially oval in cross section but with flat sides is used, which, when applied, prevents rotative movement between the two parts of the link. In this form the end of the link which has the projection 6 extending from it has on the shoulder 9 at its outer side a forwardly extending flange 14, which seats in and engages a recess 15 in the forward end of the outer arm 3 of the opposing half-link. This projection and recess engagement between the parts of the link not only holds the link against spreading, but also against relative movement of the parts.

I have found that links constructed in accordance with my invention may be manufactured commercially, because of their simple construction, at low cost, and when used have been found to be comparable in strength and durability with the links cast in one piece.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In stud links for anchor chains, a link comprising two similarly shaped members and a spacing member, each similarly shaped member having at one end a forwardly extending projection and at the other end a pair of forwardly extending arms, the projection and arms in each member having registering apertures extending therethrough, a key seating in the apertures in the projections and arms, and a spacing member inside the link mounted on said key.

2. In stud links for anchor chains, comprising a spacing member and two similarly shaped members of U-shape, each U-shaped member having at one end a projection and at the other end a slot whereby the projection of one will enter the slot of the other, and anti-spreading means comprising overlapping flanges on the two members, the said spacing member and U-shaped members being apertured for the reception of a securing key.

3. In chain connecting links, two U-shaped members, each member having at one end a forwardly extending projection and at the other end a pair of forwardly extending arms, the projection and arms in each member having registering apertures therethrough, and a key seating in the apertures in the projections and arms whereby said U-shaped members are flexibly connected together.

DAVID ADAMS.